United States Patent
Ishigami

(10) Patent No.: US 7,639,870 B2
(45) Date of Patent: Dec. 29, 2009

(54) PICTURE SIGNAL PROCESSING METHOD AND IMAGE SIGNAL PROCESSING APPARATUS

(75) Inventor: Koichiro Ishigami, Kanagawa (JP)

(73) Assignee: Sony Corporation, Tokyo (JP)

( * ) Notice: Subject to any disclaimer, the term of this patent is extended or adjusted under 35 U.S.C. 154(b) by 435 days.

(21) Appl. No.: 10/486,904

(22) PCT Filed: Aug. 8, 2002

(86) PCT No.: PCT/JP02/08140

§ 371 (c)(1),
(2), (4) Date: Feb. 17, 2004

(87) PCT Pub. No.: WO03/017642

PCT Pub. Date: Feb. 27, 2003

(65) Prior Publication Data

US 2004/0212814 A1    Oct. 28, 2004

(30) Foreign Application Priority Data

Aug. 17, 2001    (JP) ............................. 2001-248210

(51) Int. Cl.
*G06K 9/00* (2006.01)
*G03F 3/08* (2006.01)

(52) U.S. Cl. .................. 382/162; 382/167; 358/518; 358/520

(58) Field of Classification Search ......... 382/162–169; 358/591, 345, 1.9, 518, 520

See application file for complete search history.

(56) References Cited

U.S. PATENT DOCUMENTS 4,507,685 A * 3/1985 Kawamura .................. 358/536

(Continued)

FOREIGN PATENT DOCUMENTS

DE    36 29 469 A1    3/1988

(Continued)

OTHER PUBLICATIONS

Rolleston R J; "Luminance Dependent Scaling of Schominance Data"; Xerox Disclosure Journal, Xerox Corporation.; Stamford, Conn, US; vol. 20, No. 3, May 1, 1995; pp. 275-282.

(Continued)

*Primary Examiner*—John B Strege
(74) *Attorney, Agent, or Firm*—Robert J. Depke; Rockey, Depke & Lyons, LLC

(57) ABSTRACT

Disclosed is a picture signal processing method for outputting a color picture. In encoding input picture data YCbCr into picture data for printing in a YCC picture formulating unit (2), chromaticity Cb, Cr are processed non-linear conversion processing by a non-linear function f(c), with the luminance Y remaining unaffected, to generate picture data for printing Ycb'Cr'. In a cmyk converter 3, the picture data for printing Ycb'Cr', generated by the YCC picture formulating unit (2), are processed non-linear conversion processing by an inverse function f'(c) of the non-linear function f(c) to perform color space conversion processing matched to the color space of an output device. This converts the picture data for printing Ycb'Cr' into picture data for output printing cmyk to improve color reproducing quality by controlling the encoding density locally in a wide color gamut.

10 Claims, 7 Drawing Sheets

U.S. PATENT DOCUMENTS

| | | | |
|---|---|---|---|
| 4,812,902 A * | 3/1989 | Fuchsberger | 358/521 |
| 5,060,060 A | 10/1991 | Udagawa et al. | |
| 5,377,025 A * | 12/1994 | Spaulding et al. | 358/518 |
| 5,502,579 A * | 3/1996 | Kita et al. | 358/518 |
| 5,838,333 A * | 11/1998 | Matsuo | 345/604 |
| 2002/0180877 A1* | 12/2002 | Kikuchi | 348/315 |
| 2003/0038956 A1* | 2/2003 | Aotsuka | 358/1.9 |
| 2003/0053085 A1* | 3/2003 | Takemoto | 358/1.9 |
| 2003/0053095 A1* | 3/2003 | Nakami | 358/1.9 |

FOREIGN PATENT DOCUMENTS

| | | |
|---|---|---|
| EP | 0 703 701 A2 | 3/1996 |
| JP | 05-292303 A | 11/1993 |
| JP | 07-212583 A | 8/1995 |
| JP | 07-212611 A | 8/1995 |
| JP | 10-283470 A | 10/1998 |
| JP | 2000-244757 A | 9/2000 |
| JP | 2001-094808 | 4/2001 |
| JP | 2001-211341 A | 8/2001 |
| JP | 2001-238091 A | 8/2001 |
| JP | 2002-152530 | 5/2002 |
| JP | 2002-152530 A | 5/2002 |
| WO | WO 98/44722 | 10/1998 |

OTHER PUBLICATIONS

Nin S I et al.; "Printing Cielab Images on A CMYK Printer Using Tri-Linear Interpolation"; Proceedings of the Spie, Spie, Bellingham, VA, US; vol. 1670, Feb. 11, 1992; pp. 316-324, XP000953839.

James Z Chang et al.; "Sequential Linear Interpolation of Multidimensional Functions"; IEEE Transactions on Image Processing; IEEE Service Center; Piscataway, NJ, US; vol. 6, No. 9; Sep. 1997 XP011026203.

* cited by examiner

PICTURE SIGNAL PROCESSING METHOD AND IMAGE SIGNAL PROCESSING APPARATUS

This application claims priority to Japanese Patent Application Number JP2001-248210, filed Aug. 17, 2001 which is incorporated herein by reference.

TECHNICAL FIELD

This invention relates to a picture signal processing method and a picture signal processing apparatus for outputting a color picture.

BACKGROUND ART

Recently, reduction in cost and increase in the processing speed in devices handling color picture data are progressing speedily and, in keeping pace therewith, a wide variety of systems, handling color pictures, exemplified by a system exchanging color picture data over a network, such as the Internet, or a desk top publishing system for carrying out the editing operations, including color picture data, with the aid of a computer, are rapidly coming into extensive use.

The devices handling color pictures differ in input/output characteristics of expressible colors or gradations, depending on the device sorts, such that, if the color picture data are simply exchanged between the devices of different sorts, the colors reproduced become different from one device to another. For example, if, when a picture displayed on a monitor is output as a hard copy on a printer, the color gamut that may be represented on a monitor differs from the gamut that may be represented on a printer, it may be an occurrence that the color of a picture represented on the monitor differs from that of a picture output as a hard copy by the printer.

As a large variety of systems handling color pictures have been put to practical use, the concept of a so-called device independent color in which color pictures of the same colors may be reproduced between different sorts of the devices on the system has become crucial. The system which implements the device independent color is generally termed a color management system, a representative example of which is Colorsync of MacOS and ICM of Windows.

In the color management system, the device independent color is implemented by matching physical calorimetric values of the color signals of the input/output device. Specifically, color signals of an input picture from an input device, such as a video camera 61, a scanner 62 and a monitor 63, are converted into color signals in a device-independent color space (e.g. CIE/XYZ, CIE/L*a*b*) based on a device profile the color gamut conversion equation or the color gamut conversion table of which has been defined from one device to another, as shown in FIG. 1. When the color signals are output from output devices, such as a monitor 63 or a printer 64, these color signals are converted into output color picture signals in the color space associated with the devices based on a device profile having a color gamut changing equation or a color gamut conversion table defined from one device to another.

Thus, if, with the color management system, color signals are converted from an input picture color signal of an input system to an output color picture signal of an output system, the input picture color signal is converted once into color signals in a device-independent color space, based on the device profile, for realization of the device-independent color, as shown in FIG. 2. Meanwhile, the device profile is a file in which a color gamut changing equation or a color gamut conversion table has been defined. Stated differently, the device profile is a file in which there are stored a set of parameters calculated from the relation between the color signal values of the device (e.g. RGB or CMYK) and color values as measured by e.g. a colorimeter (e.g. XYZ or L*a:b*).

In case the relation between color signal values of a device and color values of a picture realized by these color signal values is non-linear, as in a printer, the routine practice is to use a lookup table (LUT) as a device profile.

Color printing in a color printer is realized by controlling the amount of deposition of colorants of cyan (c), magenta (m) and yellow (y) with black (k). However, in a control interface for each of specified printer types, color signals for printing received in particular by machine types of general usage or application are mostly not cmy(k) but RGB signals. Since picture input equipment, such as digital cameras, output equipment, such as display monitors, or the application software, usually handle colors represented in RGB, it is naturally convenient to issue commands with RGB for printing as well. It should be noted that the control interface means a so-called printer driver software, operating on a calculating device, such as a personal computer, distinct from the printer, a firmware operating on a calculating device mounted within the main body unit of the printer, or an electronic circuit within the inside of the main body unit of the printer, and denotes a processor for converting input color signals for printing into control signals for a specified printer. Inherently, RGB is device signals, such as signals of monitors or cameras. Recently, as standard encoding in the sRGB color space [IEC 61966-2.1] has come into extensive use, control interfaces of printers of different types receiving these data are now able to make substantially common interpretation. However, the color gamut reproducible with a printer is locally wider than the color gamut limited with the encoding of the sRGB color space, such that, if a printer receives signals encoded with sRGB, the color reproducing capabilities of the printer cannot be exploited sufficiently.

On the other hand, in the DCF Version 1.0 [JEIDA49-2-1998], extensively used in Japan, there is shown a guideline for encoding picture data with the YCC (luminance chromaticity separation color space) uniquely associated with the sRGB color space. If, in the YCC not restricted to the color gamut of sRGB, the camera has also recorded data outside the sRGB color gamut, and if, in effecting color conversion of the recorded YCC for printer outputting, picture data is encoded once in the sRGB color space, data recorded by the camera cannot be exploited sufficiently. Thus, in a printer having an interface for directly reading picture data, imaged by e.g. a digital still camera, from a camera or a recording medium, attempts are made to effect color conversion of data, recorded with YCC, based on a unique interpretation which expands the color gamut such as by allowing negative values in the sRGB color space in the processing inside the printer. However, when imaged picture data of a camera are sent to a printer driver on a personal computer via e.g. an application software, it is necessary for the application software and the printer driver to make common interpretation as to the expansion of the color gamut. Thus, it is efficacious to use the standard color space which expands the color gamut of the sRGB color space to enable the encoding, such as sYCC, for example, IEC61966-2.1 AnnexF, the standardization for which is currently proceeding in IEC, as in Exit2.2 standard picture file format standard Version 2.2 (for a digital still camera).

However, if the color gamut that can be encoded is expanded to add the information outside the color gamut, the information volume inside the color gamut is relatively diminished. If signals of three channels is encoded by sRGB and sYCC with the same data volume, the sYCC is lower in density of the visual information in a portion of the perception-equal color space close to the achromatic color contained in a larger quantity in a natural picture. For showing this example, FIG. 3 plots the gamut of $L^*=50\pm5$ of values encoded with the information volume for both sRGB/sYCC on a chromaticity diagram of the CIELAB color space. This leads to disruption of gray balance, pseudo-contour and collapse in gradation to deteriorate the picture quality. It is noted that the information of the 4 [bit/channel] is formed as the values encoded with 8 [bit/channel] is uniformly decimated based on sRGB/sYCC.

Meanwhile, in the color management system, the device profile, used to match the colorimetric values among different devices, states the device color reproducing characteristics in terms of the relation between device signal values (e.g. RGB or cymk) and color values (e.g. XYZ or $L^*a^*b^*$). In the case of a device, such as a printer, this relation is generally expressed in the form of a lookup table.

On the other hand, if a printer control interface converts data for printing of input signals (e.g. RGB or cymk) into printer control signals (e.g. cymk) in e.g. a printer driver software operating on e.g. a personal computer, an appropriate LUT, prepared from the outset in consideration of color reproducibility of a target printer, is referenced to perform color space conversion calculations. Since the LUT influences the color reproducibility, such a LUT having a large number of lattice points and thus having a higher density is preferably used in order to obtain high precision color reproducing results. If the storage capacity of a recording medium is taken into account, it is required to prepare the LUT with a limited number of lattice points. In the above-described method for preparing the LUT, grid positions are calculated by equal division even in the chromaticity directions, such as $a^*$ or $b^*$, the number of grid points of the LUT entering the device color gamut is small, and hence the amount of the information correlating the device signals and the color signals in the color gamut is small, with the result that the color reproducibility is not that good.

In order to overcome such deficiency, the present Assignee has proposed, in the specification and drawings of the Japanese Patent Application 2000-340456, a color correction processing method in which the grids of the LUT are not of uniform intervals and non-linear positions obtained on applying a suitable S-function are used to diminish the grid density in the vicinity of the gray area.

It is an object of the present invention to provide a picture signal processing method and a picture signal processing apparatus in which this technique for enhancing the efficiency is applied not to the LUT referenced by the conversion processing system for the printing data but to the printing data itself to render it possible to locally control the encoding density in the broad color gamut to improve the color reproducing quality.

DISCLOSURE OF THE INVENTION

According to the present invention, color signals output to a printer and transmitted in a YCC color space (luminance chromaticity separation color space) are converted into non-linear form and encoded to render it possible to control the encoding density locally in a wide color gamut to improve the color reproducing quality.

That is, according to the present invention, when encoded color signals are received from a signal formulating unit, configured for encoding color signals for printing, and are sent to a signal interpreting unit configured for converting the signal into a printing control command for a printer, encoding is carried out in a YCC color space converted into the non-linear form.

In a picture signal processing method, according to the present invention, when input picture data by a luminance chromaticity separation space YCbCr is encoded into picture data for printing, the chromaticity Cb, Cr is processed non-linear conversion by a non-linear function f(c) to generate picture data for printing YCb'Cr'.

In a picture signal processing method, according to the present invention, printing picture data YCb'Cr', obtained on non-linear conversion by a non-linear function f(c) of chromaticity Cb, Cr of picture data by the luminance chromaticity separation space YCbCr, is processed non-linear conversion processing by an inverse function f'(c) of the non-linear function f(c) to apply color space conversion processing for matching to the color space of an output device to convert the picture data for printing YCb'Cr' into picture data for print outputting.

In a picture signal processing method wherein, when input picture data by a luminance chromaticity separation space YCbCr is encoded into input picture data for printing, the chromaticity Cb, Cr is processed non-linear conversion by a non-linear function f(c) to generate picture data for printing YCb'Cr'. These picture data for printing YCb'Cr' are processed non-linear conversion by an inverse function f'(c) of the non-linear function f(c) to perform color space conversion matched to the color space of the output device, thereby converting the picture data for printing YCb'Cr' into picture data for print outputting.

A picture signal processing apparatus according to the present invention includes non-linear conversion processing means for applying non-linear conversion processing to the chromaticity Cb, Cr by a non-linear function f(c), in encoding input picture data in a luminance chromaticity separation space YCbCr to picture data for printing, wherein input picture data YCbCr is converted into picture data for printing YCb'Cr' by the non-linear conversion processing means.

A picture signal processing apparatus according to the present invention comprises non-linear conversion processing means for applying non-linear conversion by an inverse function f'(c) of the non-linear function f(c) to picture data for printing YCb'Cr', obtained on applying non-linear conversion by a non-linear function f(c) to chromaticity Cb, Cr of picture data by the luminance chromaticity separation space YCbCr, and color space conversion processing means for applying color space conversion processing for matching to a color space of an output device, whereby the picture data for printing YCb'Cr' is converted to picture data for print outputting.

A picture signal processing apparatus according to the present invention comprises means for generating picture data for printing, the means for generating picture data for printing applying non-linear conversion processing by a non-linear function f(c) to chromaticity Cb, Cr to generate picture data for printing YCb'Cr', in encoding input picture data by the luminance chromaticity separation space YCbCr into picture data for printing, and conversion processing means for applying non-linear conversion processing, by an inverse function f'(c) of a non-linear function f(c), to the picture data for printing YCb'Cr', generated by the means for generating picture data for printing, and for applying color space conversion processing matched to the color space of an output device, to the picture data for printing, to convert the picture data for printing YCb'Cr' into picture data for output printing.

Other objects and specific advantages of the present invention will become more apparent from the following detailed explanation of preferred embodiments which is now made with reference to the drawings.

BEST MODE FOR CARRYING OUT THE INVENTION

Figure 1:
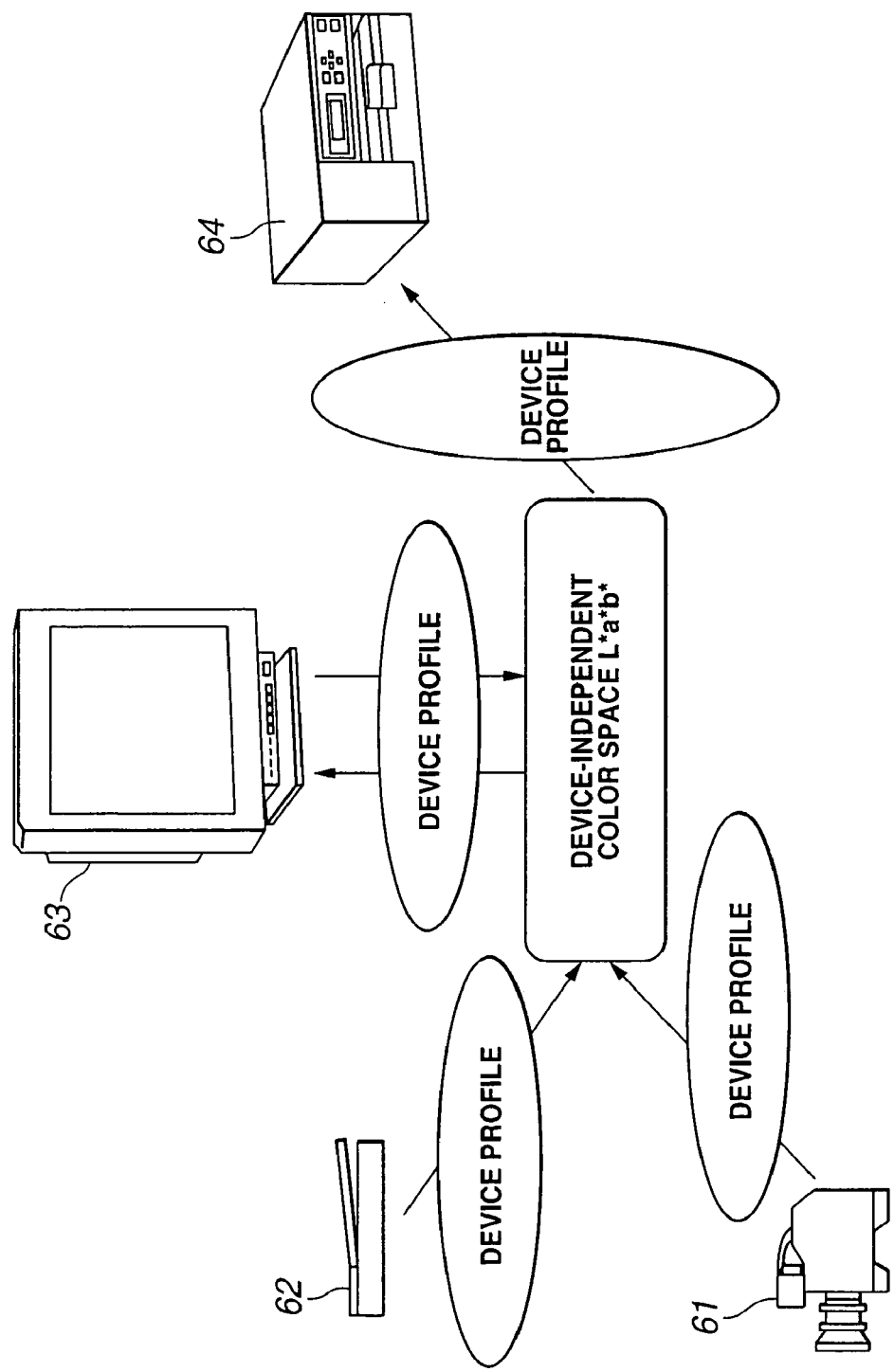
FIG. 1 shows the concept of a color management system.
Figure 2:
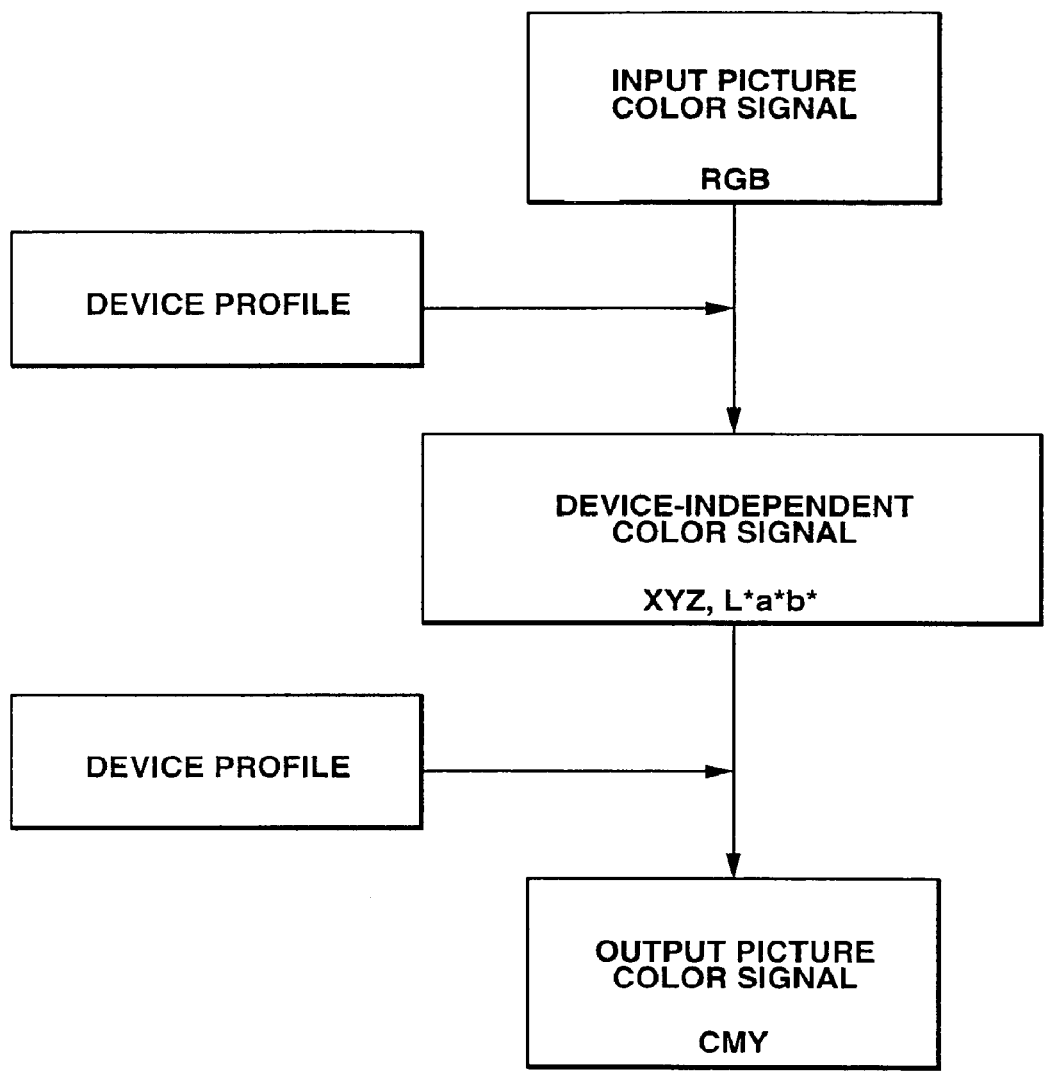
FIG. 2 shows the flow of processing for implementing device-independent colors.

Referring to the drawings, a preferred embodiment of the present invention is now explained in detail.

Figure 4:
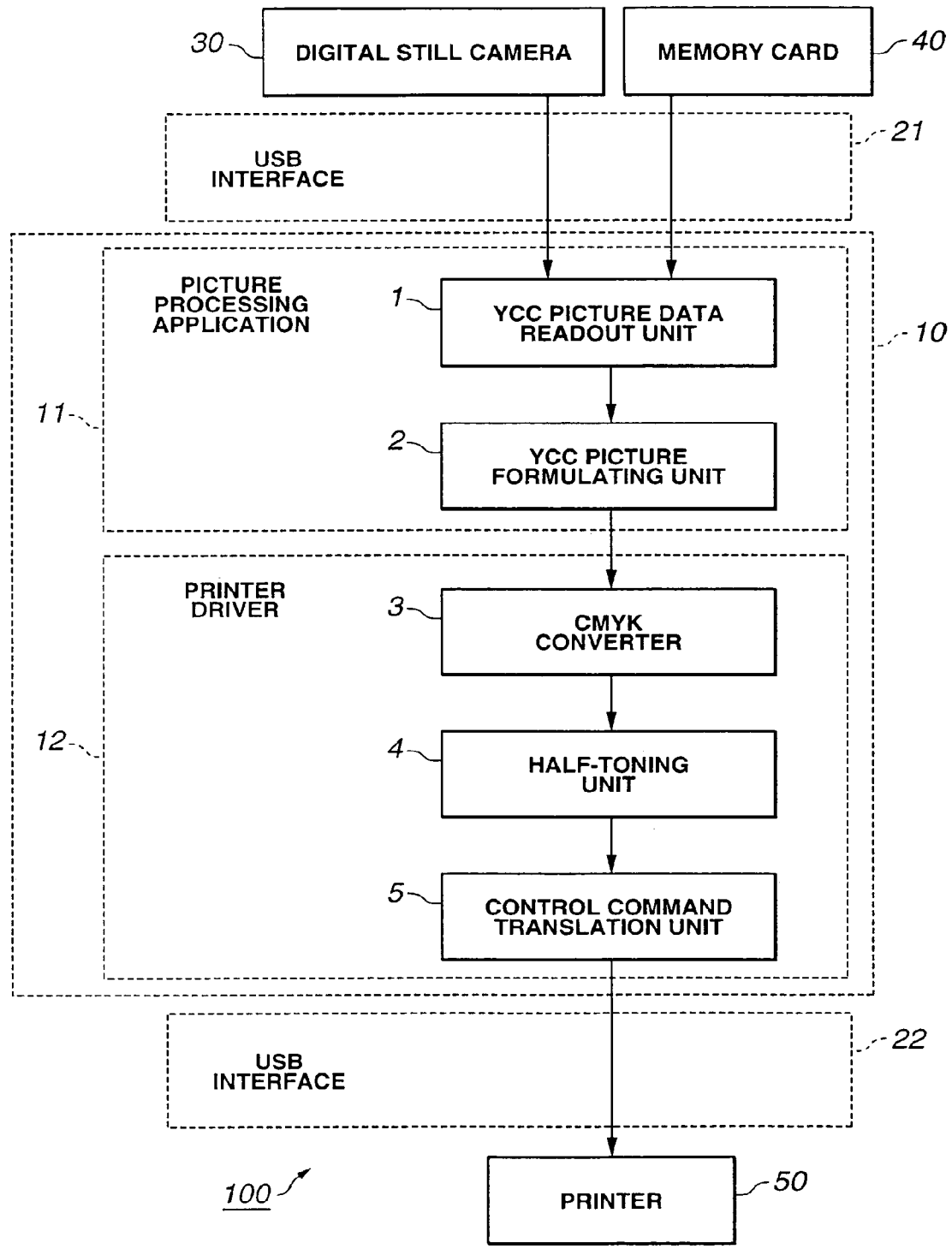
FIG. 4 is a block diagram showing the structure of a picture signal processing apparatus embodying the present invention.

The present invention is applied to a picture processing apparatus 100, shown in FIG. 4, as an example. This picture processing apparatus 100 is made up by a picture processing application 11 and a printer driver 12, both operating on a personal computer 10

The picture processing application 11 is made up by a YCC picture data readout unit 1 and a YCC picture formulating unit 2. The YCC picture data readout unit 1 reads out a picture data file, conforming to e.g. the DCF Version 1.0 [JEIDA-49-2-1998], from a digital still camera 30 or a memory card 40, over a USB interface 21, and interpolates sampling pixels by YCbCr 4:2:2 or YCbCr 4:2:0, for obtaining color data of YCbCr (8 bits/channel) from one pixel to the next. The YCC picture formulating unit 2, on the other hand, converts the YCbCr (8 bit/channel) color data, obtained by this YCC picture data readout unit 1, into YCC (8 bit/channel) for printing, in order to transfer the information to a printer driver 12.

The YCC color space here conforms to sYCC [such as IEC61966-2.1 AnnexG, currently being standardized in the IEC].

The printer driver 12 is made up by a cmyk converter 3, a half-toning unit 4, and a control command translation unit 5. The cmyk converter 3 receives the YCC information for printing, prepared by the YCC picture formulating unit 2, to convert the so received information into cmyk (8 bit/channel) picture data, while the half-toning unit 4 applies half-toning processing (processing of conversion to 2 bits each of CMYK per pixel) to the cmyk picture data obtained on conversion by the cmyk converter 3. The control command translation unit 5 applies control command translating processing to the cmyk picture data, processed with half-toning by the half-toning unit 4, to generate a printer control command for commanding picture data printing. The control command translation unit 5 transmits the so generated printer control command via a USB interface 22 to a printer 50.

The printer 50 performs printing in accordance with the printer control command.

Figure 5:
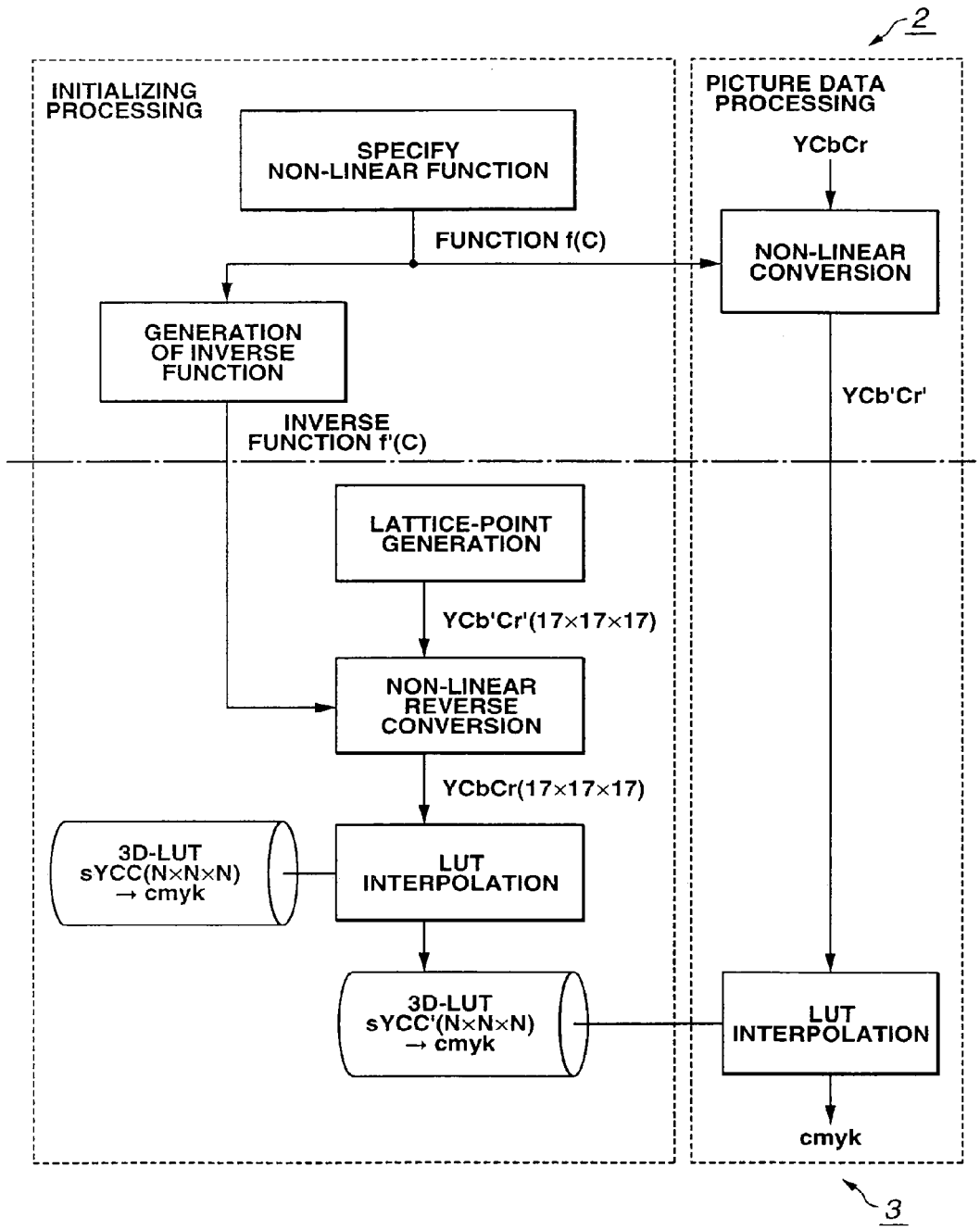
FIG. 5 schematically shows the contents of processing performed in a YCC picture formulating unit and a cmyk converter in a picture processing apparatus embodying the present invention.

In the present picture processing apparatus 100, the picture formulating unit 2 and the cmyk converter 3 execute the processing shown in FIG. 5.

That is, during the picture data processing, the YCC picture formulating unit 2 encodes the YCbCr (8 bits/channel) signal of the received picture data into a YCC signal for printing. Although Y remains unchanged at this time, the chromaticity Cb, Cr are converted by a non-linear function f(c), shown in FIG. 6, for raising the gradation resolution in the vicinity of the achromatic color, and the resulting picture data YCb'Cr' are encoded each in 8 bits, which are then sent to the cmyk converter 3.

The non-linear function f(c) used may be a non-linear function f(x) shown in the following equation (1):

$$0 \leq x < 128 \quad (1)$$
$$f(x) = -128 \times \frac{\log(1 + k \times (128 - x))}{\log(1 + k \times 128)} + 128$$
$$128 \leq x < 255$$
$$f(x) = 127 \times \frac{\log(1 + k \times (x - 128))}{\log(1 + k \times 127)} + 128$$

where k is a coefficient and log is natural logarithm.

The non-linear function f(x) may be represented by the following general formula (2):

$$0 \leq x < 2^{n-1} \quad (2)$$
$$f(x) = -2^{n-1} \times \frac{\log(1 + k \times (2^{n-1} - x))}{\log(1 + k \times 2^{n-1})} + 2^{n-1}$$
$$2^{n-1} \leq x < 2^n - 1$$
$$f(x) = 2^n - 1 - 2^{n-1} \times \frac{\log(1 + k \times (x - 2^{n-1}))}{\log(1 + k \times (2^n - 1 - 2^{n-1}))} + 2^{n-1}$$

where n is the number of bits for encoding x.

During the initialization processing, which is carried out before starting the picture data processing, the YCC picture formulating unit 2 determines the above equation as the non-linear function f(c) and formulates a numerical table by its inverse function f'(c) to send the so formulated numerical table to the cmyk converter 3. The table tabulates the results of the conversion for 256 stages of 0 to 256 in 8 bits.

During the initializing processing, the cmyk converter 3 formulates a three-dimensional LUT (lookup table), having laid therein cmyk signals of the printer 50, corresponding to YCC signals for printing, as received from the YCC picture formulating unit 2. The cmyk converter 3 refers to a table, received from the YCC picture formulating unit 2, to convert Cb and Cr at N×N×N lattice points, obtained on equal (N−1) division of each of the YCC axes (0 to 255), into Cb' and Cr', respectively. In the pre-recorded three-dimensional LUT, the cmyk signals (8 bit/channel) of the printer 50, corresponding to the sYCC, are laid in the N×N×N lattice points. The lattice points on the same Y-plane of the three-dimensional LUT are referred to as a two-dimensional LUT to calculate the values of c, m, y and k corresponding to Y, Cb' and Cr' by interpolation calculations to record the calculated values. During processing of the picture data, the YCC signals for printing, received from the YCC picture formulating unit 2, are converted into cmyk signals (8 bits/channel) of the printer 50, from pixel to pixel, by interpolation calculations, such as linear interpolation, as reference is had to the three-dimensional LUT prepared at the time of initialization.

It is sufficient that the picture processing application 11 and the printer driver 12 perform similar operations not on the personal computer 10 but on calculating units or on electronic circuits within the other equipment or the printer 50.

In a configuration in which the printer driver 12 is not necessarily in keeping with the YCC input, it is desirable to discriminate whether or not the printer driver 12 is in keeping with the YCC input, in the picture processing application 11, and to omit the above processing when the printer driver is in keeping only with the RGB, in which case YVV is converted into RGB and output. In case the printer driver 12 is in keeping with the YCC input but is not necessarily in keeping with the above-described non-linear code, it is checked whether or not the printer driver 12 is in keeping with the non-linear code in the picture processing application 11 and, if the result of check is negative, it is desirable to omit the portion of the above processing which corresponds to the non-linear conversion.

For non-linear conversion in the picture formulating unit 2, not the equation but a table prepared in advance may be used.

The parameters of the non-linear function f(c) transmitted from the picture processing application 11 to the printer driver 12 need not be the above table of the numerical values and, if it is determined that non-linear characteristics are expressed by a common predetermined numerical equation by the YCC picture formulating unit 2 and a cmyk converter 3, the parameters of the numerical equation may be used. In case plural common fixed non-linear function f(c) are presupposed for the YCC picture formulating unit 2 and the cmyk converter 3, an index representing the selection may be used. If the cmyk converter 3 has a specified intrinsic non-linear function, the numerical table, parameters of the numerical figure or the indexes, representing the non-linear characteristics, may be acquired by the picture formulating unit 2 by loading from the cmyk converter 3. If a fixed sole non-linear function f(c), common to the YCC picture formulating unit 2 and the cmyk converter 3, is presupposed, it is unnecessary to transmit the parameters.

As for the information of the non-linear function f(c), transmitted by the picture processing application 11 to the printer driver, it is sufficient if the YCC picture formulating unit 2 generates and transmits the parameters of the non-linear function f(c) to be applied to the picture data, and the cmyk converter 3 calculates the conversion corresponding to the inverse function f'(c), without it being necessary for the YCC picture formulating unit 2 to generate and transmit the parameter by the inverse function f'(c) of the non-linear function f(c) applied by the YCC picture formulating unit 2 to the picture data.

The parameter of the non-linear function f(c), transmitted by the picture processing application 11 to the printer driver 12, need not be that determined by the YCC picture formulating unit 2 solely from the inverse function f'(c) of the non-linear function f(c) as described above, but may be adjusted for intentionally acting on the print results.

It is also possible to transmit the parameters and apply the so transmitted parameter separately without applying non-linear characteristics common to Cb and Cr.

Figure 3:
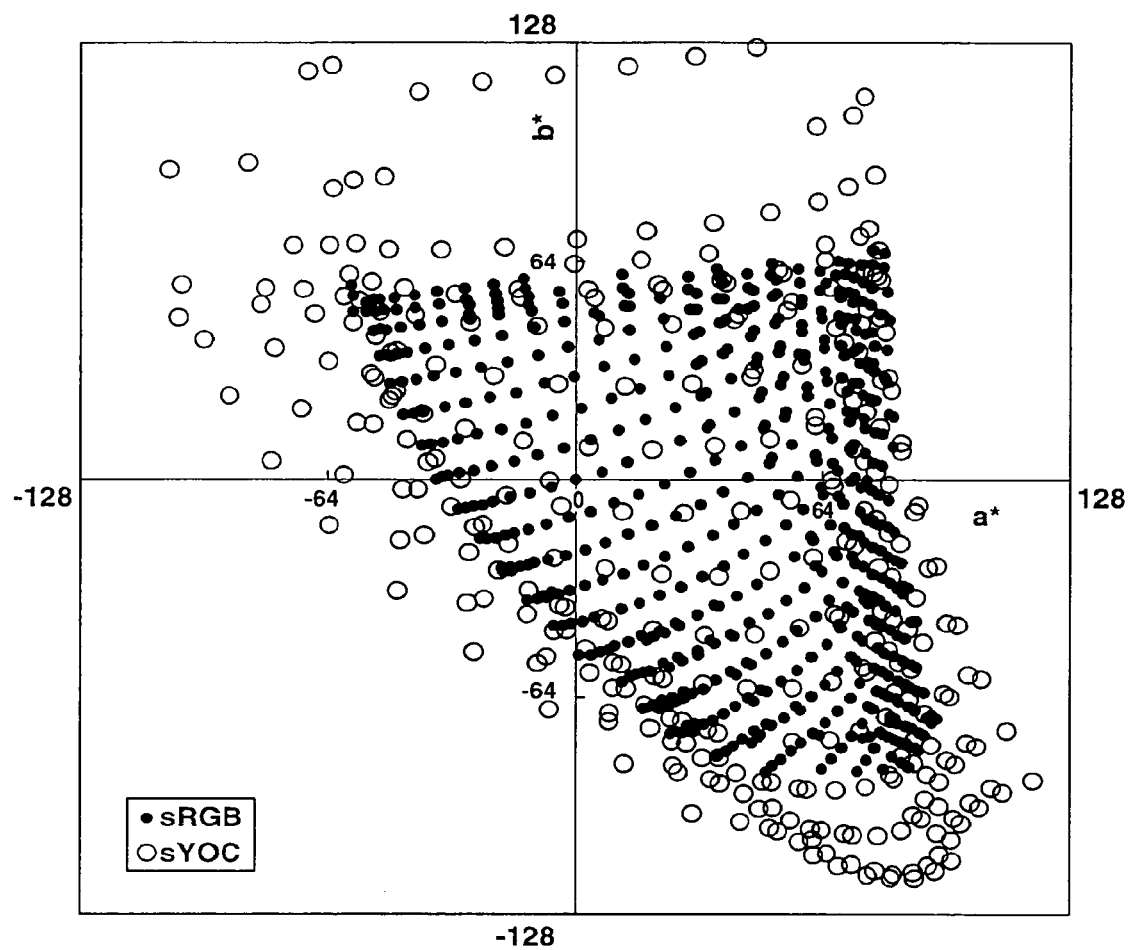
FIG. 3 shows the technique of color compression.
Figure 6:
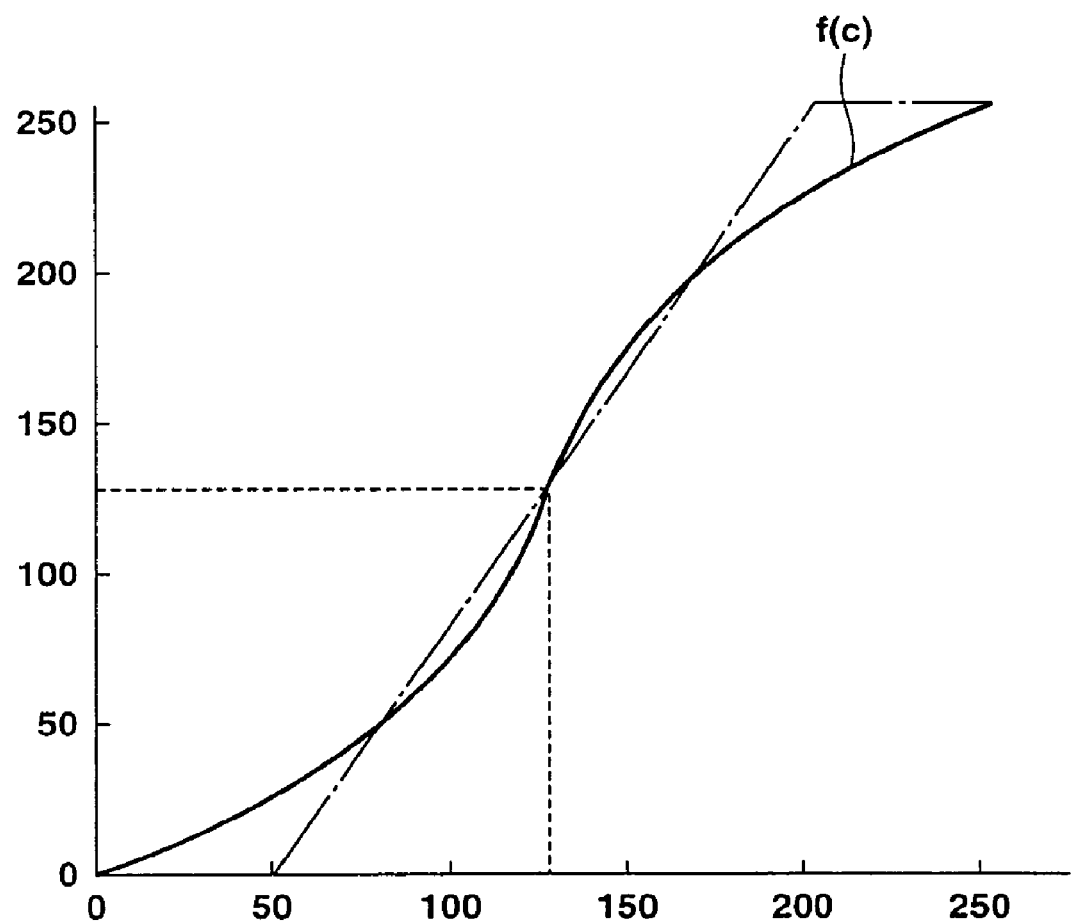
FIG. 6 shows a non-linear function used in non-linear processing applied for raising the gradation resolution in the vicinity of the achromatic color against chromaticity Cb and Cr in the picture signal processing apparatus embodying the present invention.

The function f(c), which is non-linear on the chromaticity axes, need not be vertically symmetrical with the achromatic point (Cb=Cr=128) as a boundary, as shown in FIG. 3, but mat be discontinuous, as indicated by a chain-dotted line in FIG. 6.

The non-linear coding may be applied not only to Cb, Cr but also to Y.

The cmyk converter 3 need not formulate the LUT based on the non-linear YCC lattice points, at the time of the initialization, but may perform back-conversion of non-linear characteristics of the YCC of the received picture data at the time of the processing of the picture data and convert the result by interpolative calculations, using the pre-recorded LUT by the even lattice points of the sYCC as a reference.

The picture data transmitted by the picture processing application 11 to the printer driver 12 need not be the values of the three pixel channels, encoded by YCC, but may also be index values that may reference the YCC color space.

There are occasions wherein the processing for adjusting the color or lightness in the YCC color space is performed in a pre-stage of the YCC picture formulating unit 2 in the picture processing application 11. The YCC picture data readout unit 1 may read out picture data from equipment, not shown, or from the network, or the YCC picture data readout unit 1 may be omitted, in which case the YCC picture is generated within the picture processing application 11.

Figure 7:
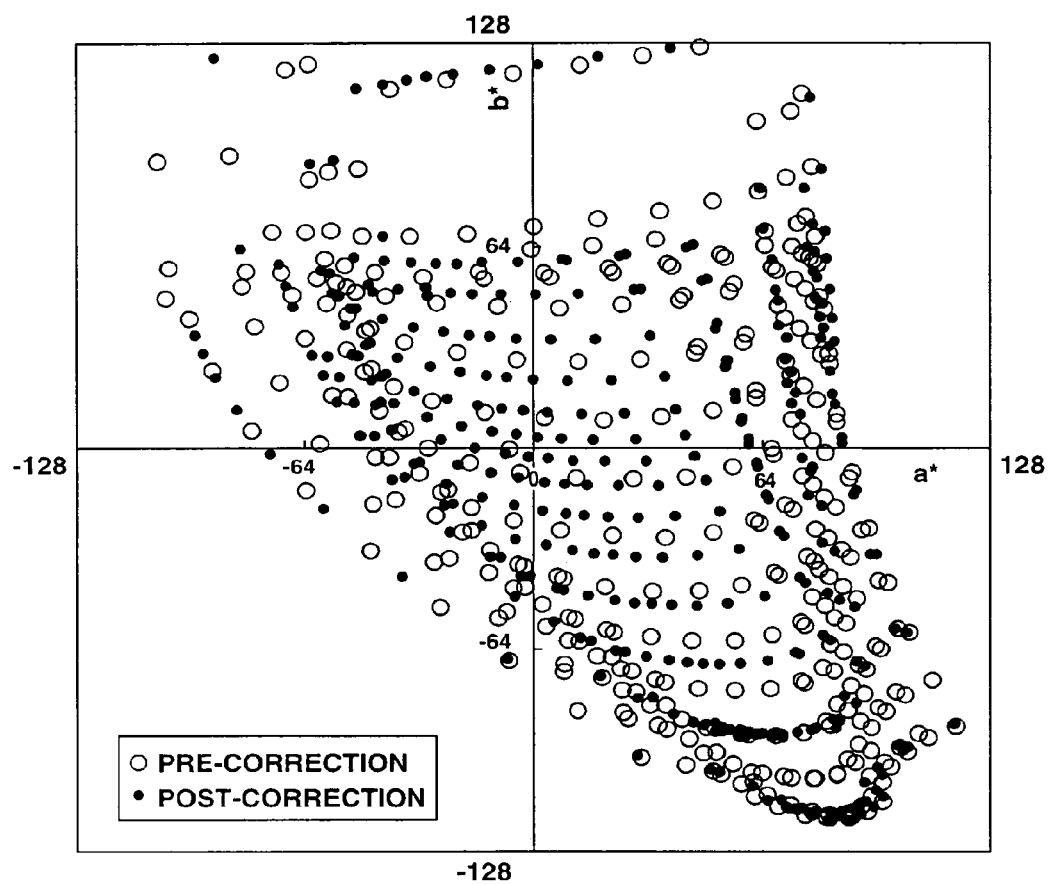
FIG. 7 shows the results of encoding the chromaticity Cb and Cr in the picture signal processing apparatus, embodying the present invention, as the density is changed under application of a non-linear function f(c) shown in FIG. 3.

In this manner, color reproducibility may locally be improved in the color space by converting the chromaticity components of the YCC picture data into non-linear components and transmitting the components in appropriately changed encoding density. FIG. 7 plots the range of L*=50±5 of the values encoded with the information volume of YCC4 [bit/channel] on a chromaticity diagram of the CIELAB color space, which is the uniform color difference space, in the same way as in FIG. 3. Specifically, FIG. 7 shows the results of encoding obtained by applying the non-linear function f(c) to each of Cb and Cr to change the density. It may be seen that the density in the vicinity of the achromatic point becomes higher. By raising in particular the density of the vicinity of the achromatic point or the skin color, it is possible to improve the color reproducibility of a natural picture.

INDUSTRIAL APPLICABILITY

According to the present invention, described above, color reproducibility in the color space may locally be improved by converting the chromaticity components of the YCC picture data and transmitting the components for changing the encoding density appropriately.

The invention claimed is:
1. A picture signal processing method comprising:
   processing input picture data by a luminance chromaticity separation space YCbCr into picture data for printing, wherein chromaticity data Cb, Cr is processed directly by a non-linear function f(c) without the use of a look up table to generate picture data for printing YCb'Cr'; and wherein the nonlinear function generates the picture data for printing YCb'Cr' such that a complete range of values for the picture data for printing YCb'Cr' corresponds with a color value range for the printer, and actual printing signal values are selected based on values determined by an inverse function f'(c) of said non-linear function f(c).
2. The picture signal processing method according to claim 1 wherein a gradation resolution is raised by said non-linear conversion processing in a portion of the picture.
3. The picture signal processing method according to claim 1 wherein
   a lookup table is formulated by applying the inverse function f'(c) of said non-linear function f(c).

4. A picture signal processing method comprising:
translating input picture data in a luminance chromaticity separation space YCbCr into input picture data for printing, wherein chromaticity data Cb, Cr are processed directly by a non-linear function f(c) without the use of a look up table to generate picture data for printing YCb'Cr'; and wherein the nonlinear function generates the picture data for printing YCb'Cr' such that a complete range of values for the picture data for printing YCb'Cr' corresponds with a color value range for the printer, and actual printing signal values are selected based on values determined by an inverse function f'(c) of said non-linear function f(c).

5. A picture signal processing apparatus comprising
non-linear conversion processing means for applying non-linear conversion processing by a non-linear function f(c) directly to chromaticity data Cb, Cr, of input picture data in a luminance chromaticity separation space YCbCr without the use of a look up table
thereby converting the picture data YCbCr into picture data for printing YCb'Cr'; and
wherein the nonlinear function generates the picture data for printing YCb'Cr' such that a complete range of values for the picture data for printing YCb'Cr' corresponds with a color value range for the printer, and actual printing signal values are selected based on values determined by an inverse function f' of said non-linear function f(c).

6. The picture signal processing apparatus according to claim 5 wherein said non-linear conversion processing means raises the gradation resolution in a portion of the picture data.

7. The picture signal processing apparatus according to claim 5 wherein at least one of said non-linear conversion processing means and the color space conversion processing means utilizes an equation for performing the conversion.

8. The picture signal processing apparatus according to claim 5 wherein
a lookup table is provided for at least one of the non-linear conversion processing and the color space conversion processing means.

9. The picture signal processing apparatus according to claim 5 further comprising
lookup table forming means for forming a lookup table by applying non-linear conversion processing to a uniform lattice in the color space of picture data for printing.

10. A picture signal processing apparatus comprising:
means for generating picture data for printing, said means for generating picture data for printing applying non-linear conversion processing directly to chromaticity data Cb, Cr for input picture data encoded by a luminance chromaticity separation space YCbCr,
applying a non-linear function f(c), to generate picture data for printing YCb'Cr' without the use of a look up table; and wherein the nonlinear function generates the picture data for printing YCb'Cr' such that a complete range of values for the picture data for printing YCb'Cr' corresponds with a color value range for the printer, and actual printing signal values are selected based on values determined by an inverse function f'(c) of said non-linear function f(c).

* * * * *